US009566966B2

(12) United States Patent
Erdem et al.

(10) Patent No.: US 9,566,966 B2
(45) Date of Patent: Feb. 14, 2017

(54) METHOD FOR CARRYING OUT A SAFETY FUNCTION OF A VEHICLE AND SYSTEM FOR CARRYING OUT THE METHOD

(71) Applicant: CONTINENTAL AUTOMOTIVE GMBH, Hannover (DE)

(72) Inventors: Bettina Erdem, Koeigstein-Mammolshain (DE); Hans-Leo Ross, Lorsch (DE)

(73) Assignee: Continental Automotive GmbH, Hannover (DE)

( * ) Notice: Subject to any disclaimer, the term of this patent is extended or adjusted under 35 U.S.C. 154(b) by 23 days.

(21) Appl. No.: 14/424,817

(22) PCT Filed: Aug. 28, 2013

(86) PCT No.: PCT/EP2013/067823
§ 371 (c)(1),
(2) Date: Feb. 27, 2015

(87) PCT Pub. No.: WO2014/033172
PCT Pub. Date: Mar. 6, 2014

(65) Prior Publication Data
US 2015/0210258 A1   Jul. 30, 2015

(30) Foreign Application Priority Data
Aug. 29, 2012   (DE) .................. 10 2012 215 343

(51) Int. Cl.
*B60T 8/88*   (2006.01)
*B60T 8/00*   (2006.01)
(Continued)

(52) U.S. Cl.
CPC ............. *B60T 8/885* (2013.01); *B60T 8/00* (2013.01); *H04L 1/20* (2013.01); *B60T 2270/406* (2013.01); *H04L 1/22* (2013.01)

(58) Field of Classification Search
None
See application file for complete search history.

(56) References Cited

U.S. PATENT DOCUMENTS 5,835,873 A * 11/1998 Darby .................. B60R 21/01
180/268
2012/0277984 A1* 11/2012 Maier .............. B60K 15/03006
701/115
2013/0261869 A1   10/2013 Brenneis et al.

FOREIGN PATENT DOCUMENTS

DE   10 2007 058 192 A1   6/2009
DE   10 2007 062 698 A1   7/2009
(Continued)

OTHER PUBLICATIONS

Purnendu Sinha: "Architectural design and reliability analysis of a fail-operational brake-by-wire system from ISO 26262 perspectives", Reliability Engineering and System Safety, Elsevier Applied Science, GB, Bd. 96, Nr. 10, Mar. 15, 2011 Seiten 1349-1359, XP028249890.
(Continued)

*Primary Examiner* — Mussa A Shaawat
*Assistant Examiner* — Abdhesh Jha
(74) *Attorney, Agent, or Firm* — Cozen O'Connor

(57) ABSTRACT

In a system and a method for performing a safety function of a vehicle, control signals are generated and transferred to a functional unit of the vehicle by a control unit. The safety function is performed by the functional unit in dependence on the control signals. Diagnostic tests are repeatedly performed at time intervals, the diagnostic tests being used to check if a fault that can interfere with the performance of the safety function is present. Metadata of the data are transferred to the control unit by the communication system, the metadata containing information about systems. This information is used to determine at least one reliability value of
(Continued)

the data by the control unit. In dependence on the at least one reliability value, the control unit checks if the transferred data are sufficiently reliable for the performance of the safety function.

7 Claims, 5 Drawing Sheets

(51) Int. Cl.
    *H04L 1/20*     (2006.01)
    *H04L 1/22*     (2006.01)

(56) References Cited

FOREIGN PATENT DOCUMENTS

DE     10 2009 033 853 A1     5/2010
DE     10 2011 115 223 A1     3/2013

OTHER PUBLICATIONS

Seo-Hyun Jeon et al.: "Automotive hardware development according to ISO 26262", Advanced Communication Technology (ICACT), 2011 13th International Conference on, IEEE, Feb. 13, 2011, Seiten 588-592, XP032013135.

* cited by examiner

| FAILURE | MEASURES | | | | | |
|---|---|---|---|---|---|---|
| | SERIAL NUMBER | TIMESTAMP | RECEPTION CONFIRMATION | IDENTIFIER FOR TRANSMITTER/ RECEIVER | DATA PROTECTION | REDUNDANCY WITH CROSS COMPARISON |
| REPETITION | X | X | | | | X |
| LOSS | X | | X | | | X |
| INSERTION | X | | X | X | | X |
| INCORRECT SEQUENCE | X | X | | | | X |
| FALSIFICATION OF MESSAGES | | | X | | X | |
| DELAY | | X | X | X | | |
| COUPLING SAFE AND NOT SAFE | | | | | | |

FIG. 3

METHOD FOR CARRYING OUT A SAFETY FUNCTION OF A VEHICLE AND SYSTEM FOR CARRYING OUT THE METHOD

CROSS-REFERENCE TO RELATED APPLICATIONS

This is a U.S. national stage of application No. PCT/EP2013/067823, filed on 28 Aug. 2013, which claims priority to the German Application No. DE 10 2012 215 343.8 filed 29 Aug. 2012, the content of both incorporated herein by reference.

BACKGROUND OF THE INVENTION

1. Field of the Invention

The invention relates to a method for carrying out a safety function of a vehicle and to a total system for carrying out this method.

2. Related Art

Modern vehicles are being increasingly equipped with active and passive protection devices. The protection devices are generally functional units of the vehicle configured to implement special safety functions in a partially or completely automated fashion. A safety function typically serves, after a defined dangerous incident or a dangerous situation has been detected and determined, to restore a state or operating mode of the vehicle that is as safe as possible or to maintain that state, in order, in this way, to avoid or at least minimize danger to persons and objects as well as personal injury and material damage. Known safety functions already in widespread use are, for example, the triggering of an airbag by an airbag system and the braking of individual wheels or of a plurality of wheels of the vehicle by an ESC system.

The carrying out of safety functions basically requires data containing information necessary for carrying out the safety function, for example information relating to the operating state or the state of movement of the vehicle. This data can be derived, for example, from sensor data of a sensor unit of the vehicle, for example a sensor unit for detecting rotational speeds of the wheels or for detecting a collision of the vehicle.

Contemporary development work has also focused on such safety functions that completely or partially assume control of the state of movement of the driving vehicle and, for example, automatically change the speed or the direction of travel of the vehicle, for example in order to prevent a rear-end collision or to drive around an obstacle.

Generally, and in particular in the case of the last-mentioned safety functions, there is, however, frequently uncertainty as to whether the data that is instantaneously available for carrying out the respective safety function (and the information contained in the data) is sufficiently safe and reliable for carrying out this safety function. In particular, there is uncertainty about the quality, the availability and the reliability of a communication system used during the transmission of the data, and in particular, uncertainty about the transmitted data quality and about possible quality losses during the reception of data. It is therefore possible, for example, for data loss or data falsification, for example due to the occurrence of a fault in the communication system during the transmission of the data, to adversely affect the carrying out of the safety function. Such an adverse effect could, for example, involve the safety function being carried out at the wrong time or using incorrectly calculated parameters.

SUMMARY OF THE INVENTION

An object of the present invention is therefore to propose a method and a system which each permit safety functions of a vehicle to be carried out as reliably and safely as possible.

Therefore, in the method proposed here, for carrying out a safety function of a vehicle by at least one communication system data, which is necessary for carrying out the safety function, is transmitted to a control unit of the vehicle. By the control unit, control signals are generated as a function of the transmitted data and are transmitted to a functional unit of the vehicle. The safety function is carried out by the functional unit as a function of the control signals.

Furthermore, diagnostic tests are carried out repeatedly at time intervals to check whether a fault is present or a failure has occurred, which can adversely affect the carrying out of the safety function or safety-relevant data, in one or more electrical, electronic and/or programmable systems used to carry out this method. These diagnostic tests are carried out in each of these systems.

For the proposed method, in accordance with an aspect of the present invention, it is also essential that metadata of the data is transmitted to the control unit by the communication system, wherein the metadata contains information about at least one of the electrical, electronic and/or programmable systems used to carry out the method. This metadata preferably contains at least information about the communication system. At least one reliability value of the data is determined by the control unit as a function of this information, which value is dependent
- on the probability of the occurrence of faults or failures that can adversely affect the carrying out of the safety function, and
- on the probability that an occurrence of these faults or failures will be detected by the diagnostic tests and/or by a driver of the vehicle in good time before the safety function is adversely affected, wherein by the control unit it is checked, as a function of the at least one reliability value, whether the transmitted data is sufficiently reliable for carrying out the safety function. Furthermore, by the control unit it can be checked whether the data necessary for carrying out the safety function (that is to say the data for the corresponding actuation of the functional unit) is completely present (including the necessary diagnostic information).

Accordingly, the total system proposed here for carrying out a safety function of a vehicle comprises the vehicle and a communication system configured to transmit data necessary for carrying out the safety function to a control unit of the vehicle. The control unit is configured to generate control signals as a function of the transmitted data and to transmit these control signals to a functional unit of the vehicle. The functional unit is configured to implement the safety function as a function of the control signals.

The total system is also configured to carry out diagnostic tests repeatedly at time intervals in order to check whether, in one or more electrical, electronic and/or programmable systems, a fault is present or a failure has occurred that can adversely affect the carrying out of the safety function.

According to the proposed method, in accordance with an aspect of the present invention, it is also essential for the total system that the communication system is also configured to transmit metadata of the data to the control unit, wherein the metadata contains information about at least one of the specified systems of the total system. This metadata preferably contains at least information about the communication system. In addition, the control unit is configured to determine at least one reliability value of the data as a function of this information, which reliability value is dependent

- on the probability of the occurrence of faults or failures that can adversely affect the carrying out of the safety function, and
- on the probability that an occurrence of these faults or failures will be detected by the diagnostic tests and/or by a driver of the vehicle in good time before the safety function is adversely affected, and to check as a function of the at least one reliability value whether the transmitted data is sufficiently reliable for carrying out the safety function. Furthermore, the control unit can be configured to check whether the data necessary for carrying out the safety function is completely present.

For the actual execution of the safety function it is typically also necessary that by using the transmitted data and the information contained therein a specific dangerous situation or a specific dangerous incident has been detected, as will be explained below using a number of examples.

The following explanations relate equally to the proposed method and to the proposed total system. This means, in particular, that examples, developments and embodiments which are only described in relation to the method or only in relation to the total system can also be correspondingly transferred to the total system or to the method. The formulation "be configured" is to be understood as meaning that the respective functional unit or the respective (electrical, electronic and/or programmable) system is configured and/or programmed in such a way that the subsequent functions can be implemented by the functional unit or the system. For example, the functional unit or the system can comprise the electrical, electronic and/or programmable components such as, for example, circuits, controllers, microchips, sensors, data memories, interfaces, data lines, receiver units, transmitter units, etc., which are necessary for this purpose. In particular, the communication system can comprise a WLAN network and/or a mobile radio network and/or some other wire-bound or wireless data transmission system, and the control unit can be equipped with receiver units or data interfaces compatible therewith.

The proposed method and total system is defined by a particularly high, so-called "functional safety level", since the safety checking and the reliability of the data required for the execution is integrated directly into the method or into the total system. For this reason it is possible, for example, as described below, to carry out the safety function while taking into account the result of this check, for example only when the checking has produced a positive result, i.e., when the data necessary for carrying out the safety function is sufficiently reliable (and complete).

The specified functional safety level denotes, in the present case, the part of the overall safety of the total system, which depends on the correct functioning of the safety-related electrical, electronic and programmable systems (also referred to below as E/E/PE systems) of the total system and, if appropriate, external devices. In the present case all such E/E/PE systems of the proposed total system used for carrying out the proposed method and in which, in the case of a fault in these E/E/PE systems, that is to say when a failure occurs in these E/E/PE systems, the carrying out of the safety function can be adversely affected by this fault or by this failure are referred to as safety-related and/or safety-relevant. Correspondingly, here and in the text which follows a fault or a failure of an E/E/PE system can be understood to refer to a non-normal condition on the respective E/E/PE system that leads to a situation in which the system can no longer fulfill its function, or can only do so to a restricted degree. Faults or failures of an E/E/PE system, which adversely affect the carrying out of the safety function in combination with other faults or failures, insofar as they are not detected in good time, are also referred to in the text which follows as functional failures, safety-relevant failures or as failures with a safety-relevant effect.

With the proposed method and the total system, all the risks owing to all the functional failures that have been detected and analyzed during the concept phase of the respective safety function can also be taken into account automatically or in an automated way during the application phase and therefore also monitored and minimized automatically or in an automated way. For example, the specified reliability value of the data can already be defined as a checking criterion during the concept phase. This reliability value is used during the application phase or the activation of the safety function to check the reliability and secure availability of the data in an automated or automatic fashion. The reliability value therefore serves as a "qualifier" which can be evaluated electronically and which represents the availability and the safety integrity of the information in a way which can be evaluated electronically. The proposed method and total system here therefore permit online analysis of the reliability, of the availability and of the quality ("safety integrity") of the data and information transmitted by the communication system.

The data necessary for carrying out the safety function may be, for example, measurement data or measurement signals of a sensor unit or of a measuring unit of the total system or may be information derived from measurement data or measurement signals. The measuring unit can be integrated into another vehicle or into a (fixed) infrastructure. This vehicle or this infrastructure are then components of the total system proposed here. The data can therefore also originate and/or be transmitted from a communication partner outside the vehicle, for example from another vehicle (car2car communication, C2C) or from a (fixed) infrastructure (car2infrastructure communication, C2X). The data can also be transmitted to the control unit of the vehicle via a chain of a plurality of such communication partners (vehicle, infrastructure). This chain of communication partners then forms a component of the communication system and therefore also forms components of the total system proposed here. The communication can either be wireless or wire-bound. Further examples of this are discussed in more detail below.

From the data necessary for carrying out the safety function it may then be apparent, in particular, that at the present there is no reason to carry out the safety function. This means that the safety function is not actually carried out in every case in which the data necessary for carrying out the safety function is completely present and sufficiently reliable. However, as a rule there is provision that the safety function is implemented, as described in the text which follows, only according to the necessary (but still actually insufficient) condition that the data which is necessary for said function is completely present and sufficiently reliable.

The specific diagnostic tests for detecting the specified faults or failures may be carried out, for example, automatically in each case by the E/E/PE systems of the total system themselves (self tests of these systems). However, it is possible that correspondingly configured diagnostic systems are used to carry out the diagnostic tests. In this way, diagnostic tests are carried out which span the total system. A fault is then detected in good time if there is still sufficient time for corresponding countermeasures in order to prevent danger or damage brought about or caused by this fault or at least to reduce said danger or damage to an acceptable degree.

The specified metadata can contain, for example, values of the abovementioned probabilities or values of one or more variables derived therefrom, such as, for example, the failure rates, diagnostic coverages, metrics or measures discussed below. The metadata may additionally or alternatively also contain device identifiers of one or more or of all the safety-relevant E/E/PE systems of the total system. In the latter case, on the basis of these device identifiers, the values of specified probabilities associated with the respective E/E/PE systems or of the failure rates, diagnostic coverages, metrics and/or measures dependent thereon can be read out, for example by the control unit, from a memory or a database and subsequently used, as described, to determine the at least one reliability value of the data.

The specified safety-relevant E/E/PE systems may be, in particular, a measuring unit or sensor unit, a transmitting unit of the communication system, a communication channel of the communication system (that is to say, for example, a WLAN system, mobile radio system such as, for example, UMTS, LTE, GPS, GPRS or EDGE) as well as a receiver unit of the control unit. In addition, the control unit and the functional unit are also typically safety-relevant E/E/PE systems of the total system.

During the specified checking as to whether the transmitted data which is necessary for carrying out the safety function is sufficiently reliable, it is possible to provide, for example, that the reliability value of the data is compared with a predefined threshold value. For example it is possible that the data is evaluated as sufficiently secure if the reliability value is higher (or alternatively lower) than this threshold value. The threshold value can be defined as a function of the risk potential (for example defined taking into account the probability of the occurrence of damage and the extent of damage which are associated with the safety function) of the respective safety function, i.e., the higher the risk potential of the safety function the greater the value which is also typically selected for the associated predefined threshold value. In the case of a plurality of reliability values it is possible to provide that each of these reliability values is compared with a predefined threshold value and, for example, the data is evaluated as sufficiently secure only if each of these reliability values is greater (or alternatively smaller) than the respective threshold value.

Generally values of measures of the reliability of the data are possible as reliability values. Generally, these measures are dependent on the abovementioned probabilities, that is to say on the probability of the occurrence of faults or failures that can adversely affect the carrying out of the safety function and on the probability that an occurrence of these faults and failures will be detected by the diagnostic tests and/or by a driver of the vehicle in good time before the safety function is adversely affected. It is also possible that one or more of the at least one reliability value is or are provided by the value of one of these probabilities itself. Possible reliability values of the data are, in particular, the failure rates, diagnostic coverages and metrics discussed below.

If the check reveals that the data necessary for carrying out the safety function is not completely present or not sufficiently reliable, it is possible to provide that
- the data transmitted to the control unit is not used to actuate the functional unit and/or
- a deactivation signal is sent to the functional unit by the control unit, wherein, after reception of this deactivation signal, the functional unit preferably automatically goes into a safety mode in which the safety function cannot be carried out. In this way it can be ensured that the safety function can be carried out only if the check reveals that the data necessary for this is not sufficiently secure and reliable.

Furthermore, in this way the method is determined for the case in which the data is not completely present or not sufficiently reliable.

Additionally or alternatively it is possible that by the control unit a signal generator of the vehicle is actuated in order to signal to the driver the result of the check, that is to say whether or not the data necessary for carrying out the safety function is completely present and sufficiently reliable. Additionally or alternatively to this it is possible to provide that if the check reveals that the data necessary for carrying out the safety function is not completely present or not sufficiently reliable, by the control unit the signal generator is actuated in order to signal to the driver the instantaneous non-availability of the safety function.

In this way, the driver is always informed about the availability of the safety function. This can assist the driver in adapting his driving behavior to the presence or absence of the safety function or functions and, if appropriate, to correspondingly orient his driving behavior in a defensive fashion. If, for example, it is signaled in this way to the driver in good time that there is not sufficiently secure and reliable data present for carrying out automated avoidance or braking maneuvers or other (partially) automated interventions into the driving operation of the vehicle, the driver can take notice of this and correspondingly drive carefully. In this way it is also ensured that the driver of the vehicle remains responsible for the safe driving of the vehicle at all times and the driver then relies on the automatic execution of the safety function, for example an autonomous, automated or partially automated intervention into the driving of the vehicle, only when it has been signaled to him that the data necessary for this is completely present and sufficiently reliable. This corresponds to the prescriptions of the Vienna Convention On Road Traffic, according to which it must be ensured at all times that the driver of a vehicle is in control of the vehicle.

It is possible that the at least one reliability value is determined as a function of at least one of the following failure rates: $l_{SPF}$, $l_{RF}$, $l_{MPF}$, $l_{MPF,L}$, $l_{MPF,D}$, $l_{MPF,P}$, $l_S$. These failure rates (frequently referred to in English as "failure in time") are statistical variables and each relate to a specific type of failure. Definitions of the individual types of failure are given below. Furthermore, each of these failure rates typically relates to, in each case, just one of the safety-relevant E/E/EP systems that can be used for carrying out the method and is part of the proposed total system, that is to say only to failures which can occur in this E/E/EP system. Separate failure rates can therefore be defined for each of these E/E/EP systems.

Each of the specified failure rates of a given safety-relevant E/E/EP system specifies the mean number of failures of a specific type of failure which occur within a time unit in the respective E/E/EP system. A typical unit of this is $10^{-9}$ failures per hour. The reciprocal value of one of these failure rates is what is referred to as the failure survival time ("Mean Time between Failures", MTBF, or "Mean Time to Failure", MTTF), that is to say the average time between two failures which occur. The failure rates are typically defined for the operating time of the respective E/E/EP system and are therefore each a measure of the fact that in the E/E/EP system under consideration a failure of a specific type occurs during the operating time of the E/E/EP system.

In particular, the following definitions of the individual types of failures to which failure rates respectively relate are possible:

$l_{SPF}$: Failures which, even when they occur alone, are functional, that is to say have a safety-relevant effect and the occurrence of which is not checked by the diagnostic tests and therefore also cannot be detected by the diagnostic tests in good time before the safety function is adversely affected;

$l_{RF}$: Failures which, even when they occur alone, are functional, that is to say have a safety-relevant effect, and the occurrence of which is checked by the diagnostic tests but is not detected by the diagnostic tests in good time before the safety function is adversely affected (the diagnostic tests have what is referred to as slip with respect to this type of failure);

$l_{MPF}$: Failures which, when they occur or are present at the same time as other failures, are functional, that is to say have a safety-relevant effect insofar as they are not detected in good time before the safety function is adversely affected;

$l_{MPF,L}$: Failures which, when they occur or are present at the same time as other failures, have a safety-relevant effect, that is to say are functional, and the occurrence of which is not checked by the diagnostic tests and therefore also cannot be detected in good time by the diagnostic tests. These failures are also referred to as latent failures;

$l_{MPF,D}$: Failures which, when they occur or are present at the same time as other failures, have a safety-relevant effect, that is to say are functional, and the occurrence of which is checked by the diagnostic tests and is also detected in good time before the safety function is adversely affected;

$l_{MPF,P}$: Failures which, when they occur or are present at the same time as other failures, have a safety-relevant effect, that is to say are functional, and the occurrence of which is detected in good time by the driver of the vehicle;

$l_S$: Failures which do not have a safety-relevant effect, that is to say are not functional, irrespective of whether or not they are detected.

It is also defined that $l_{MPF,DP}=l_{MPF,D}+l_{MPF,P}$. The following applies $l_{MPF}=l_{MPF,L}+l_{MPF,DP}$. Furthermore, the following applies $l=l_{SPF}+l_{RF}+l_{MPF,L}+l_{MPF,DP}+l_S$, wherein l is the general failure rate of the E/E/EP system, under consideration, of the total system and is a measure of the probability that any (functional or non-functional) failure occurs in this E/E/EP system.

The failure rates, which are defined in this way, in the E/E/EP systems are identical to the variables denoted by the same symbols in Standard ISO 26262, see, for example, Chapter 5 in Annex C, Section C1 of ISO 26262.

If the specified, at least one reliability value of the data is therefore determined, for example, as a function of one or more of the variables $l_{SPF}$, $l_{RF}$, $l_{MPF}$, $l_{MPF,L}$, $l_{MPF,P}$, $l_{MPF,D}$ of the E/E/EP systems, it is ensured that the reliability value is dependent on the probability of the occurrence of faults or failures which can adversely affect the carrying out of the safety function, and on the probability that an occurrence of these faults or failures is detected by the diagnostic tests and/or by a driver of the vehicle in good time before the safety function is adversely affected. In particular it is possible that one or more or each of the at least one reliability values is defined as one of the failure rates $l_{SPF}$, $l_{RF}$, $l_{MPF}$, $l_{MPF,L}$, $l_{MPF}$ of one of the safety-relevant E/E/EP systems or as a function of these failure rates.

For example, at least one reliability value of the at least one reliability value of the data is determined as a function of at least one value of a diagnostic coverage ($DC_{RF}$)

$$DC_{RF} = \left(1 - \frac{\lambda_{RF}}{\lambda}\right) \times 100$$

of at least one of the safety-relevant E/E/PE systems, used to carry out the method, of the total system. The diagnostic coverage is a particularly informative measure of the reliability of a safety-relevant E/E/PE system. This variable corresponds to the variable $K_{DC,RF}$ defined in ISO 26262, Chapter 5, Annex C, in equation C.3. It is also possible that in each case the value of the diagnostic coverage $DC_{RF}$ is determined for a plurality of the safety-relevant E/E/PE systems or for each of these systems, of the total system. Subsequently, for example these values can be used as reliability values of the data. It is alternatively or additionally also possible to determine one of the reliability values or the reliability value as a product of the values of these diagnostic coverages, that is to say as $DC_{RF,1} \times DC_{RF,2} \times DC_{RF,3} \times \ldots \times DC_{RF,n}$, where n is the number of safety-relevant E/E/PE systems of the total system. This product corresponds to what is referred to as the "Lusser Law" and is a particularly informative measure of the reliability of the total system and therefore also the data, in particular when the respective diagnostic coverage is known for each of the safety-relevant E/E/PE systems of the total system (and is included in the product as one of the factors) and the specified diagnostic tests are carried out in each of the safety-relevant E/E/EP systems.

In one development, in which a plurality of safety-relevant E/E/PE systems are also used for carrying out the method, there is provision that at least one reliability value of the at least one reliability value of the data is determined as a function of the value of the metric ($M_{SPF,RF}$)

$$M_{SPF,RF} = 1 - \frac{\sum_{safety-related\ HW\ elements}(\lambda_{SPF} + \lambda_{RF})}{\sum_{safety-related\ HW\ elements}\lambda}$$

The sum is formed over a plurality of, preferably all of, the safety-relevant E/E/PE systems of the total system which are used during the carrying out of the method. The abbreviation "safety-related HW elements" stands here and below for safety-relevant E/E/EP systems. This metric corresponds to the "single-point fault metric" defined in Standard ISO 26262, Chapter 5, Annex C, Section C.2. The metric $M_{SPF,RF}$ is informative even if the specified diagnostic tests are not carried out in each of the safety-relevant E/E/EP systems or if no diagnostic tests which span the total system are carried out.

In one embodiment of the method (and correspondingly also the total system) there is provision that if the data necessary for carrying out the safety function is not completely present or not sufficiently reliable, the data are transmitted again to the control unit after a predefined waiting time period, wherein in this way the data are repeatedly transmitted to the control unit until the data is completely present or sufficiently reliable. This is a possible way of being able to use, for example, chronologically repeated information. For example, in the event of an obstacle in front of the vehicle firstly being detected with a quality level of, for example, 10% of the maximum total quality level of the sensor and later with a quality level of 50%, it is possible, while complying with the reliability rules for such redundant information, to achieve an overall reliability of over 90% depending on the basic reliability.

In one development there is provision that the metadata is already transmitted to the control unit during a starting process of the vehicle, in particular before a start of a journey, wherein at least one reliability value of the at least one reliability value of the data is determined as a function of the value of the diagnostic coverage ($DC_{MPF,L}$)

$$DC_{MPF,L} = \left(1 - \frac{\lambda_{MPF,L}}{\lambda}\right) \times 100$$

of at least one of the safety-relevant E/E/PE systems of the total system, wherein the safety function is carried out only on the additional condition that this reliability value which is determined during the starting process is above a predefined threshold value. This diagnostic coverage corresponds to the variables $K_{DC,MPF,L}$ defined in ISO 26262, Chapter 5, Annex C, in equation C.4. In this way, allowance is made for those risks which arise from already existing but undetected faults or failures which only adversely affect the safety function in combination with other faults or failures. The diagnostic coverage $DC_{MPF,L}$ is therefore a particularly informative measure of the reliability of the total system (and therefore also for the data) relating to latent failures, see the above definition of this type of failure. The product formation described above for $DC_{RF}$ is also possible here, wherein the corresponding requirements have to be met.

In one development there is provision that the metadata is already transmitted to the control unit during a starting process of the vehicle, in particular before a start of a journey, wherein at least one reliability value of the at least one reliability value of the data is determined as a function of the value of the metric ($M_{MPF,L}$)

$$M_{MPF,L} = 1 - \frac{\sum_{safety-related\ HW\ elements}(\lambda_{MPF,L})}{\sum_{safety-related\ HW\ elements}(\lambda - \lambda_{SPF} - \lambda_{RF})},$$

wherein the sum is carried out over a plurality of, preferably over all, the safety-relevant E/E/PE systems of the total system, wherein the safety function is carried out only on the additional condional that this reliability value is above a predefined threshold value. This metric corresponds to the "latent fault metric" defined in Standard ISO 26262, Chapter 5, Annex C, Section C.3. This also allows for those risks which originate from already existing but undetected faults or failures which only adversely affect the safety function in combination with other faults or failures. The metric $M_{MPF,L}$ is a reliable measure of the reliability of the data even if the diagnostic tests do not span the total system and cover, for example, only some of the safety-relevant E/E/PE systems of the total system.

In one embodiment of the method or of the total system there is provision that the functional unit is an active or passive protection device of the vehicle. For example it can be provided that the functional unit is an electronic brake system and the safety function is an automatic brake booster, and/or in that the functional unit is an emergency braking assistant and the safety function is an automatically triggered full-braking or partial-braking operation of the vehicle, and/or in that the functional unit is an avoidance assistant and the safety function is automatic driving around an obstacle and/or in that the functional unit is an ESC unit and the safety function is automatic stabilization of the vehicle, in particular by braking one or more wheels of the vehicle and/or by throttling the engine power of the vehicle, and/or in that the functional unit is an airbag system, and the safety function is triggering of the airbag.

However, the total system may also be a vehicle connected to an electrical charging device, wherein communication and data transmission occur between the charging device and the vehicle. Here, it is possible to provide, for example, as a safety function, that before overcharging of the battery the charging current of the charging device is switched off or the charging process is ended.

BRIEF DESCRIPTION OF THE DRAWINGS

In the text which follows, the method which is proposed here and the total system which is proposed here are explained in more detail in the specific embodiments illustrated schematically in FIGS. 1 to 5. In the drawings, therefore:

FIG. 3 shows a bus system for transmitting "safety-relevant messages";

DETAILED DESCRIPTION OF THE PRESENTLY PREFERRED EMBODIMENTS

Figure 1:
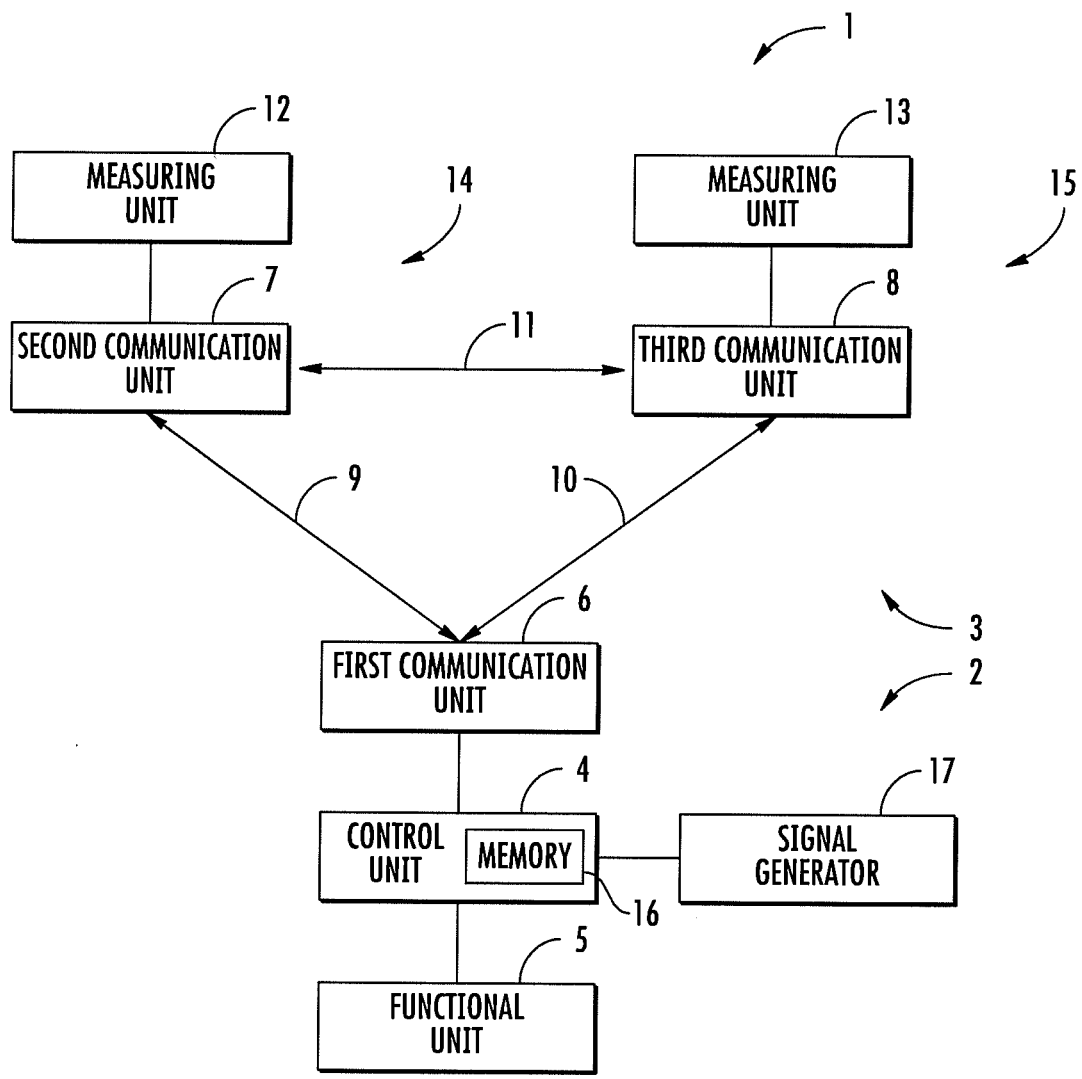
FIG. 1 shows a total system of the type proposed here for carrying out a safety function of a vehicle.

FIG. 1 shows a total system 1 of the type proposed here, which is configured to carry out a specific example of the method proposed here for carrying out a safety function of a first vehicle 2. The total system comprises the first vehicle 2 and a communication system 3, which is configured to transmit data which is necessary for carrying out the safety function, to a control unit 4 of the vehicle 2. The control unit 4 is configured to generate control signals as a function of the transmitted data and to transmit said signals to a functional unit 5 of the vehicle 2. The functional unit 5 is configured to implement the safety function as a function of the control signals.

The functional unit 5 is an electronic brake system of the vehicle 2 in the form of an emergency brake assistant, and the safety function is an automatically triggered full braking or partial braking of the vehicle 2. Likewise, however, it could equally well also be provided that the functional unit is an avoidance assistant and the safety function is automatic driving around an obstacle and/or that the functional unit is an ESC unit and the safety function is automatic stabilization of the vehicle, in particular by braking of one or more wheels of the vehicle and/or by throttling the engine power of the vehicle, and/or that the functional unit is an airbag system and the safety function is triggering of the airbag.

The total system 1 is also configured to carry out diagnostic tests repeatedly at time intervals for checking whether, in one or more of the electrical, electronic and/or programmable systems, that is to say in one of the safety-relevant E/E/PE systems of the total system 1, there is a fault or a failure has occurred that can adversely affect the carrying out of the safety function. In this example there is provision that testing can be carried out automatically by the E/E/PE systems of the total system 1 themselves (self-tests of these systems). However, it would also be possible for correspondingly configured diagnostic systems to be used to carry out the diagnostic tests. The safety-relevant E/E/PE systems include, in particular, the control unit 4, the functional unit 5 and the communication system 3, which in this example comprises a first communication unit 6 of the control unit 4 and a second communication unit 7 and a third communication unit 8. The communication units 6, 7, 8 are configured for the mutual wireless transmission of data over the mobile-radio-based communication channels 9, 10 and 11 (such as for example UMTS, LTE, GPS, GPRS or EDGE). Alternatively it would, of course, also be conceivable to use other communication units and communication channels (for example a WLAN system).

The data which is necessary for carrying out the safety function is in this example measurement data or measurement signals of a first and second measuring units 12 and 13 of the total system 1. The measuring units 12, 13 are each integrated in this example into a second or third vehicle 14 and 15, respectively, but can also be integrated into (positionally fixed) infrastructure.

The vehicles 14, 15 are therefore also parts of the total system 1. The data is therefore transmitted by car2car communication (C2C), but in the case of the specified infrastructure could also be transmitted by car2infrastructure communication (C2X). The data can also be transmitted to the first vehicle 2 via a chain composed of the second and third vehicles 14, 15.

The communication system 3 is also configured to transmit, in addition to the data, metadata of the data to the control unit 4, wherein the metadata contains information about the following safety-critical E/E/PE systems of the total system 1: the first communication unit 6, the second communication unit 7, the third communication unit, the communication channels 9, 10, 11 and the first and second measuring units 12, 13.

This metadata is, for each of these E/E/PE systems, in each case the values of the following failure rates which relate in each case to specific types of failures which can occur in the respective E/E/PE system: $l_{SPF}$, $l_{RF}$, $l_{MPF}$, $l_{MPF,L}$, $l_{MPF,D}$, $l_{MPF,P}$, $l_S$, wherein the types of failure are defined as specified above. (The definitions which are already specified above are not to be repeated here for the sake of clarity).

However, in addition to or instead of the values of these failure rates, the specified metadata can also contain values of diagnostic coverages or metrics, for example such as the diagnostic coverages and metrics specified below. The metadata can additionally or alternatively also contain device identifiers of one or more of the specified, or of all of the, safety-relevant E/E/PE systems of the total system 1. In the latter case, on the basis of these device identifiers, the values of the failure rates, diagnostic coverages or metrics which are associated with the respective E/E/PE systems can be read out from a memory 16 (or a database), for example by the control unit 4, and re-used.

The failure rates specified above for the control unit 4 and the functional unit 5, which are also safety-relevant E/E/PE systems of the total system 1, are stored in the memory 16 of the control unit 4 and are not transmitted as metadata.

The control unit 4 is configured to determine reliability values of the data as a function of this information, that is to say as a function of the failure rates. Since these failure rates depend on the probability of the occurrence of faults or failures, which can adversely affect the carrying out of the safety function, and on the probability that an occurrence of these faults or failures is detected by the diagnostic tests and/or by a driver of the vehicle in good time before the safety function is adversely affected, the reliability values also depend on these probabilities.

In particular, the values of the diagnostic coverages ($DC_{RF}$)

$$DC_{RF} = \left(1 - \frac{\lambda_{RF}}{\lambda}\right) \times 100$$

of the first communication unit 6, of the second communication unit 7, of the third communication unit 8, of the communication channels 9, 10, 11, of the first and of the second measuring units 12, 13 and of the control unit 4 and of the functional unit 5 are calculated by means of the control unit 4. Subsequently, one of the reliability values is to be determined as a product of the values of these diagnostic coverages $DC_{RF}$, that is to say the value of $DC_{RF,1} \times DC_{RF,2} \times DC_{RF,3} \times \ldots \times DC_{RF,n}$, where n is the number of safety-relevant E/E/PE systems of the total system 1. If the measurement data of the two measuring units 12, 13 is used simultaneously to actuate the functional unit, the diagnostic coverages of the two measuring units 12, 13, both those of all the communication units 6, 7, 8 and those of all the communication channels 9, 10, 11, are included in the product and therefore in the reliability value. Otherwise, only the diagnostic coverage of those measuring units whose measured values are actually used to actuate the functional unit is included in the product and therefore in the reliability value, and only the diagnostic coverages of those communication channels and communication units which are actually involved in the transmission of these measured values are included. In this case, it is, for example, possible, as described below, that the measured values of that measuring unit with which a relatively high reliability value of the data can be achieved are selected.

In a corresponding way it is also possible to determine an alternative (or additional) reliability value of the data as a value of the metric ($M_{SPF,RF}$)

$$M_{SPF,RF} = 1 - \frac{\sum_{\text{safety-related HW elements}} (\lambda_{SPF} + \lambda_{RF})}{\sum_{\text{safety-related HW elements}} \lambda}.$$

The control unit 4 checks, as a function of the reliability value of the data which is obtained as a product of the values of these diagnostic coverages $DC_{RF}$, whether the transmitted data is sufficiently reliable for carrying out the safety function by comparing the reliability value of the data with a predefined threshold value. The data is then evaluated as being sufficiently secure if the reliability value is greater (or alternatively smaller) than this threshold value. The threshold value is defined as a function of the risk potential of the safety function. The higher the risk potential of the safety function, the greater the associated predefined threshold value which is selected.

Furthermore, the control unit is configured to check whether the data necessary for carrying out the safety function is completely present.

If the check reveals that the data necessary for carrying out the safety function is not completely present or not sufficient reliable, there is provision that the data transmitted to the control unit 4 is not used to actuate the functional unit 5. Furthermore, in this case by the control unit 4 a deactivation signal is sent to the functional unit 5, wherein, after reception of this deactivation signal, the functional unit 5 automatically goes into a safety mode in which the safety function cannot be carried out. In this way it is ensured that the safety function can be carried out only if the check reveals that the data necessary for it is sufficiently secure and reliable. Furthermore in this way the method is determined for the case in which the data is not completely present or not sufficiently reliable.

In addition there is provision that by the control unit 4 a signal generator 17 of the first vehicle 2 is actuated in order to signal to the driver the result of the check, that is to say whether or not the data necessary for carrying out the safety function is completely present and sufficiently reliable. In addition there is provision that if the check reveals that the data necessary for carrying out the safety function is not completely present or not sufficiently reliable, the signal generator 17 is actuated by means of the control unit 4 in order to signal to the driver the instantaneous non-availability of the safety function.

From the transmitted data it may be apparent, in particular, that at that particular time there is no reason to carry out the safety function. This can also be indicated to the driver by the signal generator 17 if this data is sufficiently reliable. This means that the safety function is also not actually carried out in every case in which the data which is necessary for carrying out the safety function is completely present and sufficiently reliable.

In addition there can be provision that the metadata of the data is already transmitted to the control unit 4 during a starting process of the first vehicle 2 before a start of a journey. This is, of course, possible only when transmission of the data and of the metadata is already possible during the starting process. This can be implemented most easily in cases in which the measuring units 12, 13 and the communication system 3 are integrated into the first vehicle 2. This is as a rule the case when the functional unit 5 is an ESC unit and the safety function is automatic stabilization of the vehicle 2, for example by braking one or more wheels of the vehicle and/or by throttling the engine power of the vehicle.

During the starting process the systems are activated and they transmit the metadata to the control unit 4. Subsequently, values of the diagnostic coverages ($DC_{MPF,L}$)

$$DC_{MPF,L} = \left(1 - \frac{\lambda_{MPF,L}}{\lambda}\right) \times 100$$

of the first communication unit 6, of the second communication unit 7, of the third communication unit 8, of the communication channels 9, 10, 11, of the first and second measuring units 12, 13 and of the control unit 4 and of the functional unit 5 can be calculated. Subsequently, the product of the values of these diagnostic coverages, that is to say the value of $DC_{MPF,L,1} \times DC_{MPF,L,2} \times DC_{MPF,L,3} \times \ldots \times DC_{MPF,L,n}$, are to be determined as a further reliability value of the data. It is also possible that in a corresponding way an alternative (or additional) reliability value of the data is determined as a value of the metric ($M_{MPF,L}$)

$$M_{MPF,L} = 1 - \frac{\sum_{\text{safety-related HW elements}} (\lambda_{MPF,L})}{\sum_{\text{safety-related HW elements}} (\lambda - \lambda_{SPF} - \lambda_{RF})},$$

wherein the sum is preferably formed over all of the safety-relevant E/E/PE systems of the total system 1. The safety function is then carried out only on the additional condition that the reliability value which is obtained from the $DC_{MPF,L}$ (or alternatively from $M_{MPF,L}$) is above a predefined threshold value.

In this exemplary embodiment data is transmitted to the control unit 4 again after a predefined waiting time period if the data, necessary for carrying out the safety function, in the control unit 4 is not completely present or not sufficiently reliable, wherein the data is in this way transmitted repeatedly to the control unit 4 until the data is completely present and sufficiently reliable. In this way, in the event of an obstacle in front of the vehicle 2 firstly being detected with the first measuring unit 12 with a quality level of, for example, 10% of the maximum total quality level of the measuring unit 12 and is confirmed later with a quality level of 50% with the second measuring unit 13, when the reliability rules for such redundant information is complied with a total reliability of over 90% is achieved, depending on the basic reliability. As a result of this mutual confirmation of the measurement data of the first measuring unit 12 and of the measurement data of the second measuring unit 13, it is possible in this way to achieve a resulting reliability value of this data which is sufficiently high for carrying out the safety function even though the measuring data items of the measuring units 12, 13, were, when each considered individually, not sufficiently reliable for this.

The components shown in FIGS. 2 to 5 are added to a normal vehicle, which can be added to according to the valid approval procedures. All of the basic systems, such as brake, steering and so on, described here correspond to customary systems which are capable of being approved. The function described here is to control a vehicle in traffic in an automatic safe fashion (partially or fully automated systems) or to assist the driver in traffic (in the sense of contemporary driver assistance systems), wherein the driver himself continues to be responsible for the steering or steering is performed by other systems or additions to this system. The vehicle is therefore only braked or accelerated by external interventions. In the further specification, this is described by the speed control of the vehicle, wherein speed control means the range of decelerations to the stationary state and accelerations up to 130 km/h.

According to comparable principles, lateral interventions (for example steering or one-sided braking interventions (such as ESC) or vertical interventions (dynamic spring damper systems) in the vehicle are possible, but other sensors and actuators have to be involved for this purpose.

The design of the control device, which the system according to the invention, the so-called qualifier, has, should be according to ISO 26262 according to the maximum applied ASIL.

Figure 2:
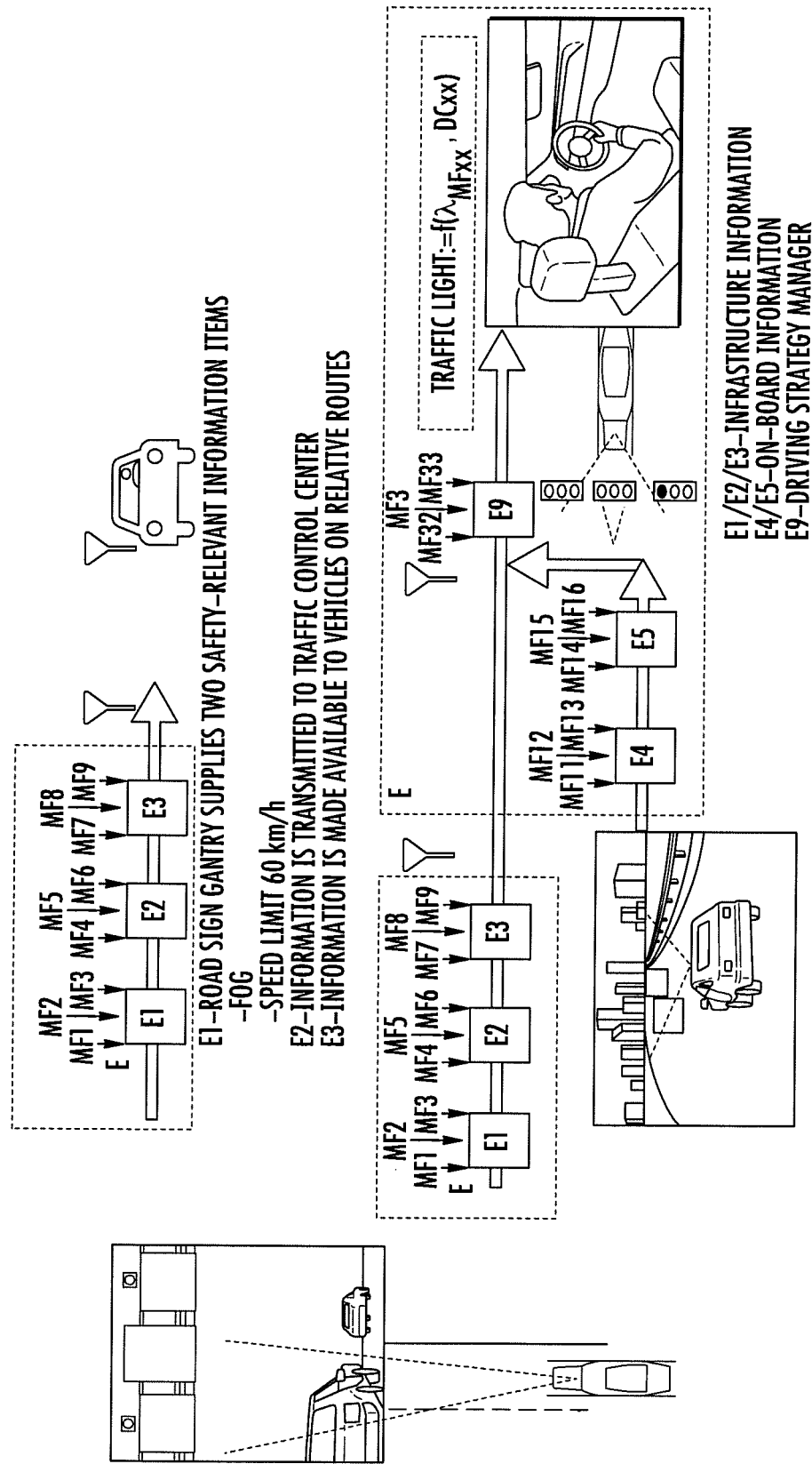
FIG. 2 shows an example of a block circuit diagram of the system.

In FIG. 2, the block circuit diagram will be explained on the basis of an example. Vehicle-external information comes in this example from a variable road sign gantry and can be transmitted by ITS-G5 and V2I communication. Inside the vehicle, information is supplied by the on-board surroundings sensor system, here in FIG. 2 by the camera or by another vehicle sensor system, for example from the ESC system.

The relevant elements are composed of:

E1—A road sign gantry on a freeway is equipped with V2X communication and can supply two safety-relevant information items.
  permissible speed limit for the following section of the route, and
  indications about weather-related or traffic-related restrictions on the traffic which can adversely affect the driving by the driver (fog, soiling of the roadway, congestion etc).
E2—Data transmission system to a traffic control center
E3—Data processing in the traffic control center
E4—Data transmission system which makes available, via mobile radio, the data of the traffic control center to the vehicles in relevant ranges. In a narrower sense, the mobile radio link to the traffic center for the respective vehicle.
E5—Camera system which carries out object recognition for road signs, traffic situation recognition in front of the vehicle, recognition of persons, roadway markings etc.
E6—Communication system to the vehicle central control device
E9—Vehicle central control device Furthermore, the vehicle has a display which can indicate the state of the safety qualifier as a symbolic traffic light.

The vehicle central control system can influence the engine management and the brake control device in the range of 0-100% of the actuating range of the respective control devices, via the vehicle communication interface.

All the systems E1 to E9 each form a diagnostic qualifier of the individual system, which makes available the diagnostic quality level at any time of data transmission.

$DC_{SPF}$=0-60% weak diagnosis
$DC_{SPF}$=60-90% static system failures are overcome
$DC_{SPF}$=90-99% dynamic system failures are overcome.

For design reasons, each system E1 to E9 supplies a reliability value (failure rate in 10E-9FIT (failure in time) per hour), which has resulted from the safety qualification of the system which is to be determined in the development process.

In sensors, this reliability value is reduced on a percentage basis by the quality level of the information acquisition in respect of the maximum detection quality.

The qualifiers can be evaluated as information for the driver according to the following principle.

Green—The secured information is present, in the following section of the route, no stationary danger is expected.

Yellow—The system cannot make available any secured information, and the driver is therefore completely responsible for driving the vehicle himself.

Red—Danger has been detected reliably in the following section of the route; if the driver does not indicate any definite reaction to the contrary (accelerating or braking relatively strongly) the vehicle is braked in a defined time window.

The system is defined in such a way that the driver drives into the control region, for example monitored section of a freeway, under his own responsibility and is also informed in good time by the system that he must completely assume control of the vehicle again.

1. Travel at a stationary speed. Speed is predefined by external systems (here the traffic control center).

2. The vehicle is accelerated to a maximum of 130 km/h by the traffic control center if the latter has secured information available for the following section of route.

3. The vehicle is braked at maximum to the stationary state by the traffic control center, depending on what information is available to the traffic control center.

4. During the control of the vehicle by the traffic control center, the vehicle-internal forward-directed sensor system serves only to observe the traffic space. If an unexpected event (load falls from vehicle travelling ahead) object (persons or animals on the carriageway) or structural (roadway defective) or position-related (vehicle leaves the carriageway) implausibilities are detected by the forward-directed sensor system, the speed control can also be assumed by the front-directed sensor system even in the case of secured information.

The driver can actively assume control of all external and internal systems for speed control by relatively strong braking or accelerating.

FIG. 3 is a conceptual illustration of a bus system for transmitting safety-relevant messages. All the diagnostic qualifiers have to be defined during the system development. The following measures should be implemented for all the communication systems. The standard failure patterns which are to be diagnosed are therefore accessible for wire-bound or non-wire-bound communication.

On the basis of an analysis of the data security of the vehicle-internal bus systems, further measures for data integrity (security measures) must be defined. If the measures which are already defined above are not sufficient, as in the case of the external data from the traffic control center, supplementary security qualifiers or transmitter signatures are to be integrated into the formation of the diagnostic coverage qualifier. This means that the diagnostic coverage qualifier can be formed only if the communication systems of the necessary measures for data security are also currently active.

An explanation of this: if the plausibility of data has to be checked before an action is initiated, for example steering, braking, intentional data manipulation is difficult because the data has to be manipulated over two independent paths in such a way that the effect is the same in the plausibility checking.

As soon as this only has effects which are staggered in terms of timing, the qualifier can discover this.

A particular advantage of the system is that now only the system which has the qualifier decides about safety-relevant degradation, and therefore the switch-off paths in the other involved systems can be deactivated or even removed. Nowadays, the subordinate systems switch off on the basis of their own diagnostics. As a result of the switching off or simple ignoring of the information in terms of safety technology the availability of the total system would increase. Self-healing systems can therefore also be activated again for safety-technical functions, depending on their state, without a visit to a workshop.

Figure 4:
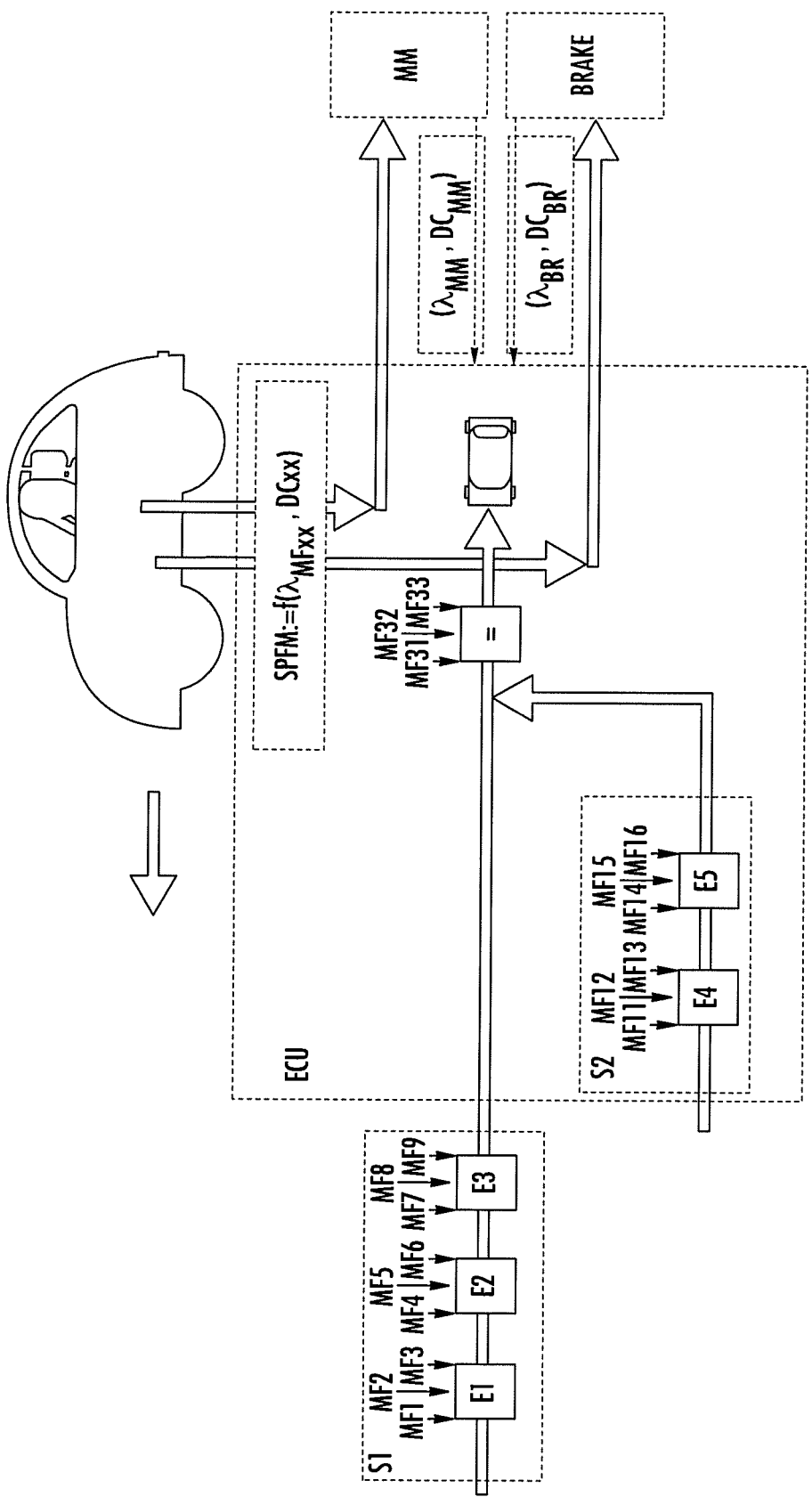
FIG. 4 shows a system block diagram.

FIG. 4 illustrates a system block diagram. The functions of the control device (ECU) comprise, for example:
  Recording of the internal and external sensor signals including their qualifier data (specific reliability data, signal quality level and diagnostic data).
  Recording of the driver's request (including the relevant diagnostic data of the involved systems or components).

Actuation of the actuators (MM, engine management and BR, brakes) via a defined remote-control input of the respective actuators.

Formation of the qualifier and monitoring and initiation of the changeover of the primary control (control of the vehicle).

Inputting of the qualifier status into a sequence and event recorder at every request or transfer of the primary control.

External systems or components have to supply the following data or information in addition to their performance data:

Quantified quality of the safety-relevant performance information (how good is the detection of the sensor (for example as a percentage value of its maximum performance)).

The system-specific or component-specific reliability (failure rate) on the basis of the safety qualification during the development). Alternatively, this information can be stored in the central control device (ECU). For reasons of data integrity, this information can also be encrypted, and therefore particularly manipulation of the external data can be avoided.

The current diagnostic status, wherein the value can be digital (diagnosis active or positive, etc.) or else is transmitted as a value of the diagnostic coverage. Also, the degree of diagnostic coverage is based on the data of the safety qualification during the product development. For reasons of data safety, this data can also be transmitted in an encrypted or signed fashion, so that external manipulation can be excluded.

The data regarding signal quality, reliability and diagnostic coverage can be encrypted or signed individually or as a block. Depending on the degree of influence, one to three data sets can be encapsulated, with the result that multiple influencing has to take place. Multiple data influencing of data which is stored and/or checked at various locations makes the intentional or unintentional manipulation of the data very difficult. As a result of the encapsulation, the safety qualifier can reject manipulated or falsified data and will always be able to initiate a safe system decision.

Figure 5:
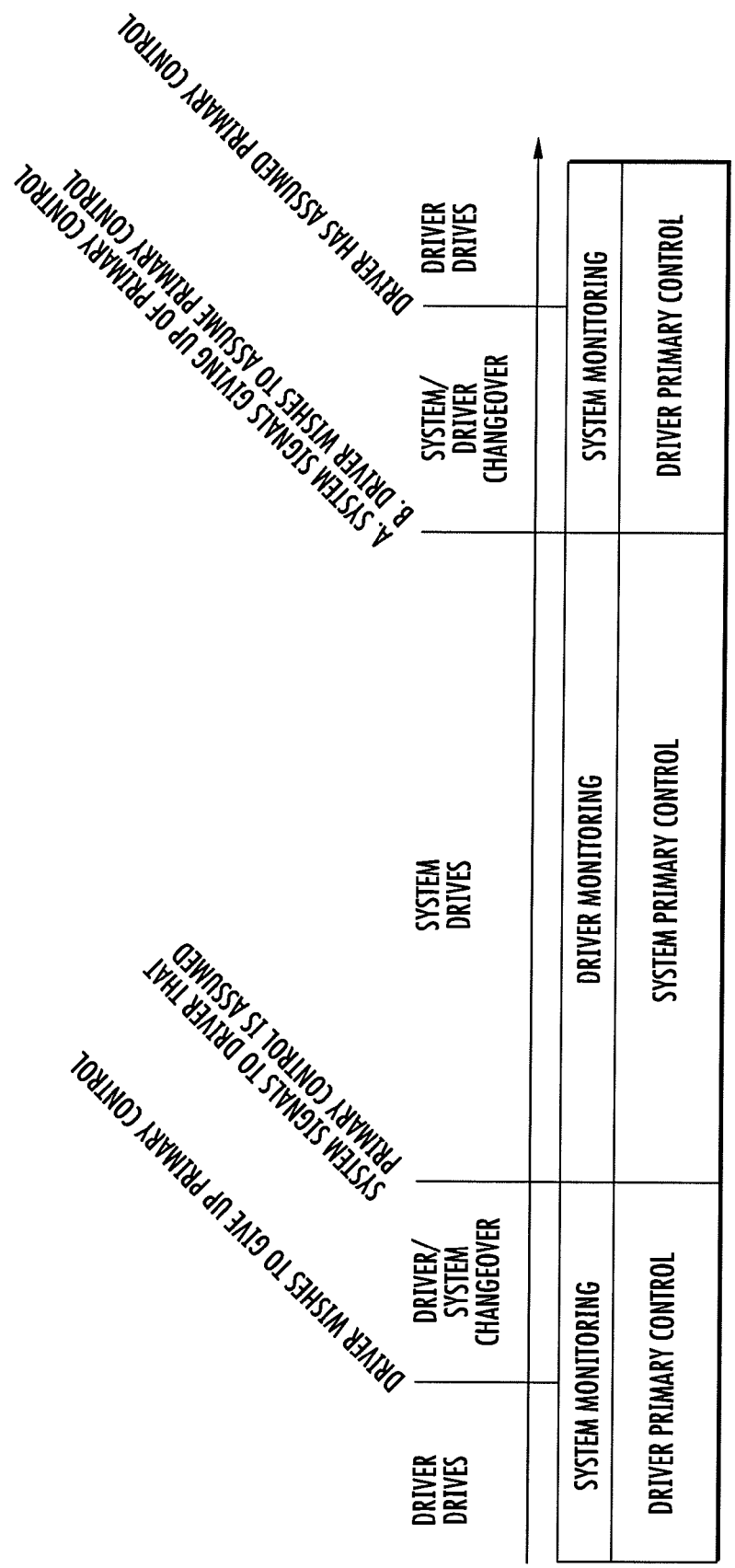
FIG. 5 shows phases of the control of the vehicle (primary control).

FIG. 5 illustrates the phases of the control of the vehicle (primary control).

At every automated function in the vehicle, the system must clearly assume control of the vehicle (primary control).

For this purpose, the following phases are considered:

The driver drives the vehicle at his own responsibility; assistance systems assist him in doing so, but never assume control over the vehicle.

Driver-system changeover, the driver wishes unambiguously to give up the control of the vehicle and the system is ready also to take over control.

The system drives, the system drives the vehicle, the driver observes the system to a qualified degree.

System-driver changeover, the system gives up control and the driver assumes the control from the system. In this context it may be the case that the driver takes over control directly or at the request of the system.

In the phase "driver drives" the driver drives the system at his own responsibility. The system is in the stand-by mode and signals to the driver the readiness to take over control when sufficient diagnoses occur.

In the "driver-system changeover" phase, the driver notifies the system, in a traceable fashion, that he wishes to give up primary control to the system. He has assured himself that he is in a driving situation in which this is permitted and also there are no further dangers for the system control. The system initializes all the relevant systems in order to take over control and initiates the corresponding functions. If the system has taken over complete primary control, the system signals this information to the driver.

In the "system drives" phase, the system has primary control for the defined function. The driver must observe the driving situation and the system so that he can take back system control at any time in a sufficient interval.

In the "system-driver changeover" phase, the system can signal the intention that it wishes to give up primary control, or the driver takes primary control away from the system.

Here, there is once more a division into the "system wishes to give up primary control" phase and into the "driver takes primary control away from the system" phase.

In the "system wishes to give up primary control" phase, the system detects at a sufficient distance that it can no longer certainly ensure primary control, (for example end of a freeway). The system is designed in such a way that it signals this message in sufficiently good time (for example a warning time of 30 s) to the driver. The scenario must be correspondingly implemented if the diagnostics of the system detect a failure which can no longer ensure the safety of the primary control. If this warning time is defined, for example, as 30 seconds, the system must be designed in such a way that it can also maintain the system control for this warning time. This can be ensured by corresponding fault-tolerant design of the system.

In order to implement the "driver takes primary control away from the system" phase, the system is designed in such a way that the driver can intuitively take over the primary control at any time. The system must change directly into the monitoring mode if the driver has unambiguously taken over the primary control.

The system detects at a safe distance that it can no longer ensure the primary control (for example end of a freeway). The system is designed in such a way that it signals this message in sufficiently good time, for example warning time of 30 s, to the driver. The scenario must be correspondingly implemented if the diagnostics of the system detect a failure which can no longer ensure the safety of the primary control. If this warning time is defined, for example, at 30 seconds, the system must be designed in such a way that it can also certainly maintain the system control for this warning time.

This can be ensured by a corresponding fault-tolerant design of the system.

The system has the primary control for the defined function. The driver must observe the vehicle, the driving situation and the system so that he can take back the system control at any time in a sufficient interval. The safety qualifier therefore functions as an archived online documentation and documents the changeover of the primary control.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SYMBOLS

1 Total system
2 First vehicle
3 Communication system
4 Control unit (ECU)
5 Functional unit
6 First communication unit
7 Second communication unit
8 Third communication unit
9 Communication channel
10 Communication channel
11 Communication channel
12 First measuring unit
13 Second measuring unit
14 Second vehicle
15 Third vehicle
16 Memory
17 Signal generator
DC Diagnostic coverage
SPFM Individual failure metric (signal-point-failure metric)
LFM Latent failure metric
PMHF Failure rate for top event (probabilistic metric for random hardware failure)
ASIL Automotive safety integrity level

The invention claimed is:

1. A method for carrying out, using one or more of electrical, electronic and/or programmable systems (3-13), a safety function of a vehicle (2), the method comprising:
transmitting data necessary for carrying out the safety function to a control unit (4) of the vehicle (2) by at least one communication system (3);
generating, by the control unit (4), control signals as a function of the transmitted data and transmitting the generated control signals to a functional unit (5) of the vehicle (2);
carrying out, by the functional unit (5), the safety function as a function of the generated control signals;
repeatedly carrying out diagnostic tests at time intervals, the diagnostic tests checking whether a fault that can adversely affect the carrying out of the safety function is present in one or more of the electrical, electronic and/or programmable systems (3-13);
transmitting, by the communication system (3), metadata of the transmitted data to the control unit (4), wherein the metadata contains information about the one or more of the electrical, electronic and/or programmable systems (3-13);
determining, by the control unit (4), at least one reliability value of the transmitted data using the metadata information, which value is dependent:
on the probability of the occurrence of failures or faults which can adversely affect the carrying out of the safety function, and
on the probability that an occurrence of these failures or faults will be detected by the diagnostic tests and/or by a driver of the vehicle (2) in time before the safety function is adversely affected;
checking, by the control unit (4), as a function of the at least one reliability value, whether the transmitted data is sufficiently reliable for carrying out the safety function; and
actuating, by the control unit (4), a signal generator (17) of the vehicle (2) to signal to the driver whether the data necessary for carrying out the safety function is completely present and sufficiently reliable.

2. A method for carrying out, using one or more of electrical, electronic and/or programmable systems (3-13), a safety function of a vehicle (2), the method comprising:
transmitting data necessary for carrying out the safety function to a control unit (4) of the vehicle (2) by at least one communication system (3);
generating, by the control unit (4), control signals as a function of the transmitted data and transmitting the generated control signals to a functional unit (5) of the vehicle (2);
carrying out, by the functional unit (5), the safety function as a function of the generated control signals;
repeatedly carrying out diagnostic tests at time intervals, the diagnostic tests checking whether a fault that can adversely affect the carrying out of the safety function is present in one or more of the electrical, electronic and/or programmable systems (3-13);
transmitting, by the communication system (3), metadata of the transmitted data to the control unit (4), wherein the metadata contains information about the one or more of the electrical, electronic and/or programmable systems (3-13);
determining, by the control unit (4), at least one reliability value of the transmitted data using the metadata information, which value is dependent:
on the probability of the occurrence of failures or faults which can adversely affect the carrying out of the safety function, and
on the probability that an occurrence of these failures or faults will be detected by the diagnostic tests and/or by a driver of the vehicle (2) in time before the safety function is adversely affected; and
checking, by the control unit (4), as a function of the at least one reliability value, whether the transmitted data is sufficiently reliable for carrying out the safety function,
wherein, if the data necessary for carrying out the safety function is not completely present or is not sufficiently reliable,
the data transmitted to the control unit (4) is not used to actuate the functional unit (5), and/or
a deactivation signal is sent to the functional unit (5) by the control unit (4), wherein, after reception of this deactivation signal, the functional unit goes automatically into a safety mode in which the safety function cannot be carried out, and/or
the data is transmitted to the control unit (4) again after a predefined waiting time period, wherein the data is in this way transmitted to the control unit (4) until the data is completely present and sufficiently reliable.

3. The method as claimed in claim 1, wherein if the data necessary for carrying out the safety function is not completely present or not sufficiently reliable, the control unit (4) actuates the signal generator (17) to signal to the driver the instantaneous non-availability of the safety function.

4. The method as claimed in claim 1,
wherein the data is produced as a function of measurement signals of at least one measuring unit (12, 13).

5. The method as claimed in claim 1,
wherein the at least one reliability value is determined as a function of at least one of failure rates $l_{SPF}$, $l_{RF}$, $l_{MPF,L}$, $l_{MPF,P}$, $l_{MPF,D}$, wherein each of said failure rates specifies the mean number of failures occurring within a time unit in the electrical, electronic and/or programmable systems (3-13), wherein the respective failure rates each relate exclusively to the following types of failures:

$l_{SPF}$: failures which, even when they occur alone, can adversely affect the carrying out of the safety function and the occurrence of which is not checked by the diagnostic tests and therefore also cannot be detected by the diagnostic tests in time before the safety function is adversely affected;

$l_{RF}$: failures which, even when they occur alone, can adversely affect the carrying out of the safety function and the occurrence of which is checked by the diagnostic tests but is not detected by the diagnostic tests in time before the safety function is adversely affected;

$l_{MPF,L}$: failures which, when they occur or are present at the same time as other failures, can adversely affect the carrying out of the safety function and the occurrence of which is not checked by the diagnostic tests;

$l_{MPF,D}$: failures which, when they occur or are present at the same time as other failures, can adversely affect the carrying out of the safety function and the occurrence of which is checked by the diagnostic tests and detected in time before the safety function is adversely affected;

$l_{MPF,F}$: failures which, when they occur or are present at the same time as other failures, can adversely affect the carrying out of the safety function and the occurrence of which is detected in time by the driver of the vehicle (2).

6. A method for carrying out, using one or more of electrical, electronic and/or programmable systems (3-13), a safety function of a vehicle (2), the method comprising:
  transmitting data necessary for carrying out the safety function to a control unit (4) of the vehicle (2) by at least one communication system (3);
  generating, by the control unit (4), control signals as a function of the transmitted data and transmitting the generated control signals to a functional unit (5) of the vehicle (2);
  carrying out, by the functional unit (5), the safety function as a function of the generated control signals;
  repeatedly carrying out diagnostic tests at time intervals, the diagnostic tests checking whether a fault that can adversely affect the carrying out of the safety function is present in one or more of the electrical, electronic and/or programmable systems (3-13);
  transmitting, by the communication system (3), metadata of the transmitted data to the control unit (4), wherein the metadata contains information about the one or more of the electrical, electronic and/or programmable systems (3-13);
  determining, by the control unit (4), at least one reliability value of the transmitted data using the metadata information, which value is dependent:
    on the probability of the occurrence of failures or faults which can adversely affect the carrying out of the safety function, and
    on the probability that an occurrence of these failures or faults will be detected by the diagnostic tests and/or by a driver of the vehicle (2) in time before the safety function is adversely affected; and
  checking, by the control unit (4), as a function of the at least one reliability value, whether the transmitted data is sufficiently reliable for carrying out the safety function, wherein the functional unit (5) is an active or passive protection device of the vehicle (2), wherein:
  the functional unit (5) is an electronic brake system and the safety function is an automatic brake booster, and/or
  the functional unit (5) is an emergency braking assistant and the safety function is an automatically triggered full-braking or partial-braking operation of the vehicle (2), and/or
  the functional unit (5) is an avoidance assistant and the safety function is automatic driving around an obstacle, and/or
  the functional unit (5) is an ESC unit and the safety function is automatic stabilization of the vehicle (2), in particular by braking one or more wheels of the vehicle (2) and/or by throttling the engine power of the vehicle (2), and/or
  the functional unit (5) is an airbag system, and the safety function is triggering of the airbag.

7. A system (1) for carrying out a safety function of a vehicle (2), the system (1) comprising:
  the vehicle;
  a control unit (4) of the vehicle (2);
  a functional unit (5) of the vehicle; and
  a communication system configured to transmit data necessary for carrying out the safety function to the control unit (4) of the vehicle (2),
wherein:
  the control unit (4) is configured to generate control signals as a function of the transmitted data and to transmit the control signals to the functional unit (5) of the vehicle (2),
  the functional unit (5) is configured to implement the safety function as a function of the control signals,
  the system (1) is configured to carry out diagnostic tests repeatedly at time intervals to check whether a fault that can adversely affect the carrying out of the safety function is present in one or more electrical, electronic and/or programmable systems of the system (1),
  the communication system is configured to transmit metadata of the transmitted data to the control unit (4),
  the metadata contains information of one or more of electrical, electronic and programmable systems (3-13) of the system (1),
  the control unit (4) is configured to determine at least one reliability value of the data as a function of the metadata information, which reliability value is dependent
  on the probability of the occurrence of faults which can adversely affect the carrying out of the safety function, and
  on the probability that an occurrence of these faults will be detected by means of the diagnostic tests and/or by a driver of the vehicle (2) in good time before the safety function is adversely affected, and
  the control unit (4) is configured to:
    check, as a function of the at least one reliability value, whether the transmitted data is sufficiently reliable for carrying out the safety function, and
    actuate a signal generator (17) of the vehicle (2) to signal to the driver whether the data necessary for carrying out the safety function is completely present and sufficiently reliable.

* * * * *